United States Patent

Treuner et al.

[11] 3,926,983
[45] Dec. 16, 1975

[54] 3-HETEROTHIO[(ALKOXYCARBONYL)THIOACETYL]CEPHALOSPORANIC DERIVATIVES

[75] Inventors: Uwe D. Treuner; Hermann Breuer, both of Regensburg, Germany

[73] Assignee: E. R. Squibb & Sons, Inc., Princeton, N.J.

[22] Filed: Aug. 30, 1974

[21] Appl. No.: 501,905

[52] U.S. Cl..... 260/243 C; 260/294.8 E; 260/329 S; 260/347.2; 260/455 R; 424/246
[51] Int. Cl.²............... C07D 501/50; A61K 31/545
[58] Field of Search................... 260/243 C

[56] References Cited
UNITED STATES PATENTS
3,812,116  5/1974  Takano et al................. 260/243 C FOREIGN PATENTS OR APPLICATIONS
2,241,250  3/1973  Germany....................... 260/243 C OTHER PUBLICATIONS
Sassiver et al., Antimicrobial Agents & Chemeotherapy, 1968, pp. 101–108, (1969).
Lewis et al., Antimicrobial Agents & Chemeotherapy, 1968, pp. 109–114, (1969).

*Primary Examiner*—Nicholas S. Rizzo
*Assistant Examiner*—Diana G. Rivers
*Attorney, Agent, or Firm*—Lawrence S. Levinson; Merle J. Smith

[57]  ABSTRACT

3-Heterothio[(alkoxycarbonyl)thioacetyl]cephalosporin derivatives which have the formula

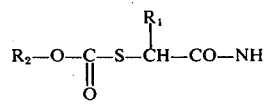

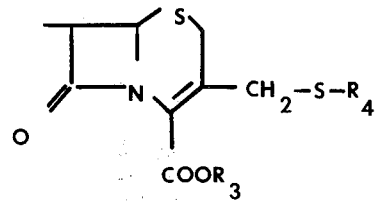

wherein $R_1$ is hydrogen, lower alkyl, phenyl or certain heterocyclic groups; $R_2$ is lower alkyl or phenyl-lower alkyl; $R_3$ is hydrogen, lower alkyl, phenyl-lower alkyl, tri(lower alkyl)silyl, tri(lower alkyl)stannyl, a salt forming ion, or

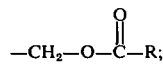

R is lower alkyl, phenyl, or phenyl-lower alkyl; $R_4$ is a five- or six-membered nitrogen and/or sulfur or oxygen-containing ring system; are useful as antibacterial agents.

10 Claims, No Drawings

3-HETEROTHIO[(ALKOXYCARBONYL)THIOACETYL]CEPHALOSPORANIC DERIVATIVES

SUMMARY OF THE INVENTION

This invention relates to a new 3-heterothio [(alkoxycarbonyl)thioacetyl]cephalosporin derivatives which have the formula

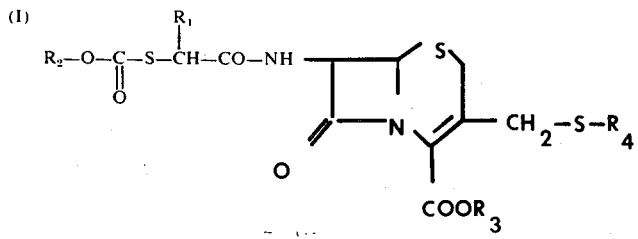

$R_1$ is hydrogen, lower alkyl, phenyl, thienyl, furyl or pyridyl.

$R_2$ is lower alkyl or phenyl-lower alkyl.

$R_3$ is hydrogen, lower alkyl, tri(lower alkyl)silyl, tri(-lower alkyl)stannyl, phenyl-lower alkyl, a salt forming ion, or

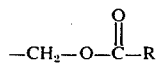

wherein R is lower alkyl, phenyl, or phenyl-lower alkyl.

$R_4$ is a five-membered or six-membered nitrogen or nitrogen and sulfur or oxygen-containing heterocyclic group including isoxazole, isothiazole, oxadiazole, thiadiazole, tetrazole, 1-oxopyridine and their lower alkyl substituted analogs.

DETAILED DESCRIPTION OF THE INVENTION

The various groups represented by the symbols have the meanings defined below and these definitions are retained throughout this specification.

The lower alkyl groups are straight or branched chain hydrocarbon groups containing 1 to 8 carbon atoms, preferably 1 to 4 carbons. Examples of the type of these groups are methyl, ethyl, propyl, isopropyl, butyl, t-butyl, pentyl, isopentyl, etc. The phenyl-lower alkyl groups include such lower alkyl groups attached to a phenyl, e.g., benzyl, phenethyl, benzhydryl, etc.

The salt forming ions represented by $R_3$ are metal ions, e.g., alkali metal ions such as sodium or potassium, alkaline earth metal ions such as calcium or magnesium, or an amine salt ion, of which a number are known for this purpose, for example, lower alkylamines like methylamine or triethylamine, aralkylamines like dibenzylamine, N,N-dibenzylethylenediamine, N-ethylpiperidine, etc.

Preferred embodiments of this invention are as follows:

$R_1$ is hydrogen, lower alkyl of 1 to 4 carbons, phenyl, benzyl, furyl, thienyl or pyridyl, especially hydrogen and phenyl;

$R_2$ is lower alkyl of 1 to 4 carbons, especially methyl or ethyl;

$R_3$ is hydrogen, alkali metal, trimethylsilyl or

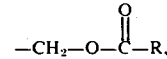

especially hydrogen, pivaloyloxymethyl, sodium or potassium. R is lower alkyl;

$R_4$ is thiadiazole, tetrazole and their methyl substituted analogs, especially, 1,3,4-thiadiazole, 5-methyl-1,3,4-thiadiazole, tetrazole and 1-methyltetrazole.

The new derivatives of [(alkoxycarbonyl)thioacetyl]cephalosporins of this invention are produced by reacting 7-aminocephalosporanic acid (7-ACA) (or derivative wherein $R_3$ is other than hydrogen) with a mercaptan HS—$R_4$ at a pH of about 8 – 8.5 to obtain the derivative of the formula

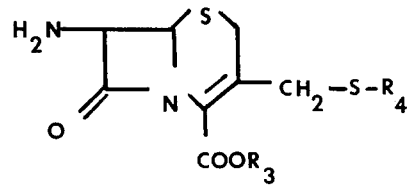

The product of formula II is then acylated on the amino group with an oxycarbonylthioacetic acid of the formula (III)

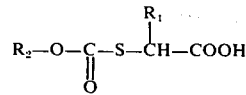

or an activated derivative of the former (II).

The activated derivatives referred to include, for example, the acid chloride or reaction product with an anhydride forming reagent such as ethylchloroformate, benzoyl chloride, pivaloyl chloride, etc., or with bisimidazolecarbonyl, dicyclohexylcarbodiimide, p-nitrophenol or the like.

According to a preferred modification, the 7-aminocephalosporanic acid derivative of formula II, in an organic solvent like tetrahydrofuran is added to a mixture containing the acid of formula III and dicyclohexylcarbodiimide in an organic solvent like the one mentioned above at a reduced temperature of about 0°C. The dicyclohexylurea formed during the reaction is removed and the product is recovered from the filtrate.

According to another modification, reaction between the 7-aminocephalosporanic acid compound of formula II and the oxycarbonylthioacetic acid is effected, for example, by converting the latter to the acid chloride with an agent such as thionyl chloride and adding, at a low temperature, e.g., 0°C. or below, the acid chloride to a mixture of the 7-aminocephalosporanic acid and a salt forming organic base, such as triethylamine, pyridine or the like, in an inert organic solvent such as chloroform, methylene chloride, dioxane, benzene or the like. The product of the reaction is then isolated by conventional procedures, e.g., by concentration or evaporation of the solvent.

Alternatively, 7-ACA or a derivative thereof ($R_3$ in formula II is other than hydrogen), can be first acylated as described in our copending application Ser. No. 468,715, filed May 10, 1974, then the product of this reaction is made to react with the mercaptan HS—$R_4$ at an alkaline pH, e.g., about pH 7.8.

The acids of formula III are formed by reacting a mercaptoacetic acid of the formula (IV) 

with a chloroformic acid ester of the formula (V) 

in the presence of an inorganic or organic base, e.g., an alkali metal hydroxide such as potassium hydroxide or triethylamine or dimethylaniline.

When $R_3$ is the acyloxymethyl group —$CH_2$—O—CO—R, this group can be introduced onto the 7-ACA moiety prior to the reaction with the acid of formula III by treatment with one to two moles of a halomethyl ester of the formula (VI)

wherein hal is halogen, preferably chlorine or bromine, in an inert organic solvent such as dimethylformamide, acetone, dioxane, benzene or the like at about ambient temperature or below.

Further process details are also provided in the illustrative examples.

Certain of the compounds of this invention may exist in different optically active forms. The various stereoisomeric forms as well as racemic mixtures are within the scope of the invention.

The compounds of this invention have antibacterial activity against both gram positive and gram negative organisms such as *Staphylococcus aureus*, *Proteus rettgeri* and *E. hafniae*. They may be used as antibacterial agents in a prophylactic manner or to combat infections caused by organisms such as those named above, and in general can be utilized in a manner similar to cephradine and other cephalosporins. For example, a compound of formula I or a physiologically acceptable salt thereof can be used in various animal species in an amount of about 1 to 100 mg./kg. daily, orally or parenterally, in single or two to four divided doses to treat infections of bacterial origin, e.g., 4.0 mg./kg. in mice.

Up to about 600 mg. of a compound of formula I or a physiologically acceptable salt thereof can be incorporated in an oral dosage form such as tablets, capsules or elixirs or in an injectable form in a sterile aqueous vehicle prepared according to conventional pharmacuetical practice.

The following examples are preferred embodiments which are illustrative of the invention and serve as models for the preparation of other compounds of this invention. Additional variations are produced in the same manner by appropriate substitution in the starting material. All temperatures are in degrees celsius.

EXAMPLE 1

DL-2[[(Ethoxycarbonyl)thio]phenyl]acetic acid 3.4 gms. (20 mM) of α-mercaptophenylacetic acid are dissolved with 2.2 gms. (40 mM) of potassium hydroxide in 50 ml. of water. 25 ml. of chloroform are added and, at a temperature of 5°, 2.2 gms. (25 mM) of ethyl chloroformate are added dropwise with intensive stirring. After 14 hours, the chloroform phase is separated, the water phase is acidified with 2N hydrochloric acid and extracted with ether. After drying and evaporating the solvent, 2.6 gms. of white crystalline DL-2-[[(ethoxycarbonyl)thio]phenyl]acetic acid are obtained, m.p. 108°–110°.

EXAMPLE 2

DL-2-[[(Methoxycarbonyl)thio]phenyl]acetic acid

By substituting methyl chloroformate for the ethyl chloroformate in the procedure of Example 1, white crystalline DL-2-[(methoxycarbonyl)thio]phenylacetic acid is obtained, m.p. 58°.

EXAMPLE 3

DL-2-[(Methoxycarbonyl)thio]-2-phenylacetic acid chloride 2.8 gms. (15 mM) of the acid obtained in Example 2 are heated with 15 ml. of thionyl chloride and 15 ml. of absolute ether for 24 hours under reflux with the exclusion of water vapor. After evaporating the solvent and excess thionyl chloride, crude DL-2-[(methoxycarbonyl)thio]-2-phenylacetic acid chloride is obtained which is used in the next step without further purification.

EXAMPLE 4

7-[[DL-2-[(Methoxycarbonyl)thio]-2-phenylacetyl]amino]-3-(hydroxymethyl)-8-oxo-5-thia-1-azabicyclo[4.2.0]oct-2-ene-carboxylic acid, 3-acetate A solution of 1.9 gms. (10 mM) of the product of Example 3 in a little chloroform is added dropwise at a temperature of −20° to a solution of 2.7 gms. (10 mM) of 7-ACA and 2 gms. of triethylamine in chloroform, with stirring. The mixture is stirred for 20 minutes at −20° and 18 hours at room temperature. The solution cools to 0°, 30 ml. of 2N hydrochloric acid are added and the solution shaken well. The chloroform is separated and washed twice each with 50 ml. of water. It is then dried over sodium sulfate and after evaporating the solvent, the 7-[[DL-2-[(methoxycarbonyl)thio]-2-phenylacetyl]amino]-3-(hydroxymethyl)-8-oxo-5-thia-1-azabicyclo[4.2.0]oct-2-ene-carboxylic acid, 3-acetate is obtained in the form of a sticky mass which, after the addition of chloroform, solidifies. After recrystallization from methylene chloride/carbon tetrachloride, the pure product forms as light beige crystals, m.p. 74°–75° (dec.).

The potassium salt is obtained by the freeze drying of a solution containing one equivalent each of the acid and potassium bicarbonate, m.p. 175° (dec.).

EXAMPLE 5

7-[[DL-2-[(Ethoxycarbonyl)thio]-2-phenylacetyl]amino]-3-(hydroxymethyl)-8-oxo-5-thia-1-azabicyclo[4.2.0]oct-2-ene-2-carboxylic acid, 3-acetate By substituting DL-2-[[(ethoxycarbonyl)thio]phenyl]acetic acid for the DL-2-[[(methoxycarbonyl)thio]phenyl]acetic acid in the procedure of Example 3 and then following the procedure of Example 4 with the product, 7-[[DL-2-[(ethoxycarbonyl)thio]-2-phenylacetyl]amino]-3-(hydroxymethyl)-8-oxo-5-thia-1-azabicyclo[4.2.0]oct-2-ene-2-carboxylic acid, 3-acetate is obtained m.p. 112°.

The potassium salt is obtained by the procedure of Example 4, m.p. 167°.

The following additional products are similarly obtained:

7-[[DL-2-[(ethoxycarbonyl)thio]acetyl]amino]-3-(hydroxymethyl)-8-oxo-5-thia-1-azabicyclo[4.2.0]oct-2-ene carboxylic acid 3-acetate 7-[[DL-2-[(n-butoxycarbonyl)thio]acetyl]amino]-3-(hydroxymethyl)-8-oxo-5-thia-1-azabicyclo[4.2.0]oct-2-ene carboxylic acid-3-acetate 7-[[DL-2-[(benzyloxycarbonyl)thio]-2-phenylacetyl]amino]-3-(hydroxymethyl)-8-oxo-5-thia-1-azabicyclo[4.2.0]oct-2-ene-2-carboxylic acid-3-acetate 7-[[DL-2-[(Benzyloxycarbonyl)thio]acetyl]amino]-3-(hydroxymethyl)-8-oxo-5-thia-1-azabicyclo[4.2.0]oct-2-ene-2-carboxylic acid-3-acetate.

EXAMPLE 6

3-[[(5-Methyl-1,3,4-thiadiazol-2-yl)thio]methyl]-7-amino-8-oxo-5-thia-1-azabicyclo[4.2.0]oct-2-ene-2-carboxylic acid A mixture of 13.6 g. (0.5 M) of 7-aminocephalosporanic acid (7-ACA) in 100 ml. of water and 50 ml. of acetone are brought to pH 8 with sodium hydroxide while stirring. 9.8 g. (0.57 M) of 2-methyl-1,3,4-thiadiazole-5-thiol are added and the mixture is heated at 80° for 4 hours. After cooling to 5°, this is acidified to pH 3.5 with dilute hydrochloric acid and stirred for 15 minutes. The precipitated solid is filtered under suction and washed with acetone. This 3-[[(5-methyl-1,3,4-thiadiazol-2-yl)thio]methyl]-7-amino-8-oxo-5-thia-1-azabicyclo[4.2.0]oct-2-ene-2-carboxylic acid is purified by dissolving in sodium bicarbonate solution and reprecipitating with 2N hydrochloric acid; yield 12.7 g., m.p. 206°.

EXAMPLE 7

3-[[(3-Methyl-1,2,4-thiadiazol-5-yl)thio]methyl]-7-amino-8-oxo-5-thia-1-azabicyclo[4.2.0]oct-2-ene-2-carboxylic acid By substituting 3-methyl-1,2,4-thiadiazole-5-thiol for the 2-methyl-1,3,4-thiadiazole-5-thiol in the procedure of Example 6, 11.6 g. of 3-[[(3-methyl-1,2,4-thiadiazol-5-yl)thio]methyl]-7-amino-8-oxo-5-thia-1-azabicyclo[4.2.0]oct-2-ene-2-carboxylic acid, m.p. 186° (dec.) are obtained.

EXAMPLE 8

3-[[(1-Methyl-1H-tetrazol-5-yl)thio]methyl]-7-amino-8-oxo-5-thia-1-azabicyclo[4.2.0]oct-2-ene-2-carboxylic acid By substituting 0.57 M of 1-methyl-1H-tetrazol-5-thiol for the 2-methyl-1,3,4-thiadiazol-5-thiol in the procedure of Example 7, 3-[[(1-methyl-1H-tetrazol-5-yl)thio]methyl]-7-amino-8-oxo-5-thia-1-azabicyclo[4.2.0]oct-2-ene-2-carboxylic acid is obtained.

EXAMPLE 9

3-[[(5-methyl-1,3,4-thiadiazol-2-yl)thio]methyl]-7-amino-8-oxo-5-thia-1-azabicyclo[4.2.0]oct-2-ene-2-carboxylic acid, diphenylmethyl ester 18 g. of 7-amino-3-[[(5-methyl-1,3,4-thiadiazol-5-yl)thio]methyl]-8-oxo-5-thia-1-azabicyclo[4.2.0]oct-2-ene-2-carboxylic acid are suspended in 350 ml. of tetrahydrofuran. 4.1 ml. of 70% perchloric acid are added dropwise. After 30 minutes, a slightly turbid solution forms. This solution is filtered and to the filtrate is added dropwise with stirring 12 g. of diphenyldiazomethane and 20 ml. of tetrahydrofuran. After 3 hours, the reaction mixture is poured into 2 liters of absolute ether. The solid, light brown precipitate, which is the perchloric acid salt of the desired product, is dried over Kieselgel in a dessiccator. To obtain the base, the perchloric acid salt is dissolved in water and treated with the calculated equivalent of potassium bicarbonate. The aqueous solution obtained is extracted with chloroform. The chloroform phase is treated with activated carbon and sodium sulfate to obtain the 10 g. of the product, 7-amino-3-[[(5-methyl-1,3,4-thiadiazol-2-yl)thio]methyl]-8 -oxo-5-thia-1-azabicyclo[4.2.0]oct-2-ene-2-carboxylic acid, diphenylmethyl ester, as a light brown powder, m.p. 157°–159°. The product is recrystallized from tetrahydrofuran/petroleum ether. The isomeric thiadiazolyl derivative is similarly obtained from the product of Example 7.

EXAMPLE 10

3-[[(1-Methyl-1H-tetrazol-5-yl)thio]methyl]-7-amino-8-oxo-5-thia-1-azabicyclo[4.2.0]oct-2-ene-carboxylic acid, diphenylmethyl ester The product, 7-amino-3-[[(1-methyl-1H-tetrazol-5-yl)thio]methyl]-8-oxo-5-thia-1-azabicyclo[4.2.0]oct-2-ene-carboxylic acid, diphenylmethyl ester, m.p. 168°–169° (dec.), is obtained by the procedure of Example 9 utilizing as starting material 7-amino-3-[[(1-methyl-1H-tetrazol-5-yl)thio]methyl]-8-oxo-5-thia-1-azabicyclo[4.2.0]oct-2-ene-2-carboxylic acid.

EXAMPLE 11

3-[[(1-Methyl-1H-tetrazol-5-yl)thio]methyl]-7β-[[[(methoxycarbonyl)thio]phenylacetyl]amino]-8-oxo-5-thia-1-azabicyclo[4.2.0]oct-2-ene-2-carboxylic acid diphenylmethyl ester 1.1. g. (5 mM) of the product of Example 2 is dissolved in 25 ml. of tetrahydrofuran and added at 0° to 1.0 g. of dicyclohexylcarbodiimide in 5 ml. of tetrahydrofuran. After 30 minutes, 2.48 gm. of 3-[[(1-methyl-1H-tetrazol-5-yl)thio]methyl]-7-amino-8-oxo-5-thia-1-azabicyclo[4.2.0]oct-2-ene-2-carboxylic acid diphenylmethyl ester dissolved in 15 ml. of tetrahydrofuran is added. After stirring for 12 hours, the dicyclohexylurea which has formed is filtered off. The filtrate is treated with activated carbon and the solvent is drawn off leaving 3-[[(1-methyl-1H-tetrazol-5-yl)thio]methyl]-7β-[[[(methoxycarbonyl)thio]phenylacetyl]amino]-8-oxo-5-thia-1-azabicyclo[4.2.0]oct-2-ene-2-carboxylic acid diphenylmethyl ester as a light brown powder, yield 2.7 g., m.p. 92°–94° (dec.).

EXAMPLE 12

3-[[(1-Methyl-1H-tetrazol-5-yl)thio]methyl]-7β-[[[(methylcarbonyl)thio]phenylacetyl]amino]-8-oxo-5-thia-1-azabicyclo[4.2.0]oct-2-ene-2-carboxylic acid 2 g. of the product of Example 11 is stirred in a mixture of 15 ml. of trifluoroacetic acid and 3 ml. of anisole at 0° for 15 minutes. After the solvent is drawn off and the residue is treated with ether/petroleum ether (1:1), the solid brown residue is taken up in sodium bicarbonate solution, filtered and the filtrate is extracted with ethyl acetate and then acidified to pH 2.5 with 2N hydrochloric acid while cooling with ice. This is extracted with ethyl acetate. The organic phase is treated with activated carbon and the solvent is drawn off to obtain the product 3-[[(1-methyl-1H-tetrazol-5-yl)thio]methyl]-7β-[[[(methoxycarbonyl)thio]-phenylacetyl]amino]-8-oxo-5-thia-1-azabicyclo[4.2.0]oct-2-ene-2-carboxylic acid. The product is recrystallized from tetrahydrofuran/petroleum ether as a light brown powder, yield 0.5 g., m.p. 128° (dec.).

EXAMPLE 13

3-[[(1-Methyl-1H-tetrazol-5-yl)thio]methyl]-7β-[[[(methoxycarbonyl)thio]phenylacetyl]amino]-8-oxo-5-thia-1-azabicyclo[4.2.0]oct-2-ene-2-carboxylic acid, potassium salt The potassium salt of the product of Example 12 is obtained by freeze drying an equimolar aqueous solution of the acid of that example and potassium bicarbonate, m.p. 153°–154° (dec.).

EXAMPLES 14 – 44

The products below are obtained by reacting the acid

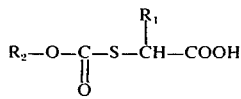

with the diphenylmethyl ester of one of the following according to the procedure of Example 11 and then following with the procedure of Example 12. Salts are produced by continuing with the procedure of Example 14.

3-[[(5-methyl-1,3,4-thiadiazolyl-2-yl)thio]methyl]-7-amino-8-oxo-5-thia-1-azabicyclo[4.2.0]oct-2-ene-2-carboxylic acid
3-[[(1-methyl-1H-tetrazol-5-yl)thio]methyl]-7-ACA
3-[[(3-isothiazolyl)thio]methyl]-7-ACA
3-[[(1,3,4-oxadiazol-2-yl)thio]methyl]-7-ACA
3-[[(5-ethyl-1,3,4-oxadiazol-2-yl)thio]methyl]-7-ACA
3-[[(1,2,3,4-tetrazol-5-yl)thio]methyl]-7-ACA
3-[[(1-ethyl-1H-tetrazol-5-yl)thio]methyl]-7-ACA
3-[[(3-methyl-5-isothiazolyl)thio]methyl]-7-ACA
3-[[(3-isothiazolyl)thio]methyl]-7-ACA
3-[[(3-isoxazolyl)thio]methyl]-7-ACA
3-[[(5-methyl-3-isoxazolyl)thio]methyl]-7-ACA
3-[[(1,2,4-thiadiazol-3-yl)thio]methyl]-7-ACA
3-[[(5-butyl-1,2,4-thiadiazol-3-yl)thio]methyl]-7-ACA
3-[[(5-ethyl-3-isoxazolyl)thio]methyl]-7-ACA
3-[[(3-methyl-4-isoxazolyl)thio]methyl]-7-ACA
3-[[(3-methyl-1,2,4-oxadiazol-5-yl)thio]methyl]-7-ACA
3-[[(5-ethyl-3-isothiazolyl)thio]methyl]-7-ACA
3-[[(2-methyl-1,3,4-thiadiazol-5-yl)thio]methyl]-7-ACA
3-[[(1,2,4-thiadiazol-5-yl)thio]methyl]-7-ACA
3-[[(2-pyridinyl-N-oxide)thio]methyl]-7-ACA Example 14:  7β-[[[2-(methoxycarbonyl]thio]-2-(2-pyridyl)acetyl]amino]-3-[[(1,3,4-thiazol-2-yl)thio]methyl]-8-oxo-5-thia-1-azabicyclo[4.2.0]oct-2-ene-2-carboxylic acid 15:  7β-[[[2-(n-butoxy)carbonyl]thio]-2(phenylacetyl]amino]-3-[[(1,3,4-oxadiazol-2-yl)thio]methyl]-8-oxo-5-thia-1-azabicyclo[4.2.0]oct-2-ene-2-carboxylic acid 16:  7β-[[[2-ethoxy)carbonyl]thio]-2-(2-pyridyl)acetyl]amino]-3-[[(5-ethyl-1,3,4-oxadiazol-2-yl)thio]methyl]-8-oxo-5-thia-1-azabicyclo[4.2.0]oct-2-ene-2-carboxylic acid 17:  7β-[[[2-(methoxy)carbonyl]thio]acetyl]amino]-3-[[(3-methyl-5-isothiazolyl)thio]methyl]-8-oxo-5-thia-1-azabicyclo[4.2.0]oct-2-ene-2-carboxylic acid oct-7β-[[[(2-ethoxy)carbonyl]thio]-2-(2-thienyl)acetyl]amino]-3-[[(3-isothiazolyl)thio]methyl]-8-oxo-5-thia-1-azabicyclo[4.2.0]oct-2-ene-2-carboxylic acid 19:  7β-[[[2-(benzyloxy)carbonyl]thio]-2-phenylacetyl]amino]-3-[[(3-isoxazolyl)thio]methyl]-8-oxo-5-thia-1-azabicyclo[4.2.0]oct-2-ene-2-carboxylic acid 20:  7β-[[[2-(methoxy)carbonyl]thio]-2-phenylacetyl]amino]-3-[[(5-methyl-3-isoxazolyl)thio]methyl]-8-oxo-5-thia-1-azabicyclo[4.2.0]oct-2-ene-2-carboxylic acid 21:  7β-[[[2-(propoxy)carbonyl]thio]-2-phenylacetyl]amino]-3-[[(1,2,4-thiadiazol-5-yl)thio]methyl]-8-oxo-5-thia-1-azabicyclo[4.2.0]oct-2-ene-2-carboxylic acid 22:  7β-[[[2-(phenethoxy)carbonyl]thio]acetyl]amino]-3-[[(1,2,4-thiadiazol-3-yl)thio]methyl]-8-oxo-5-thia-1-azabicyclo[4.2.0]oct-2-ene-2-carboxylic acid 23:  7β-[[[2-(methoxy)carbonyl]thio]-2-phenylacetyl]amino]-3-[[(5-butyl-1,2,4-thiadiazol-3-yl)thio]methyl]-8-oxo-5-thia-1-azabicyclo[4.2.0]oct-2-ene-2-carboxylic acid 24:  7β-[[[2-(methoxy)carbonyl]thio]butyramido]-3-[[(1,2,3,4-tetrazol-5-yl)thio]methyl]-8-oxo-5-thia-1-azabicyclo[4.2.0]oct-2-ene-2-carboxylic acid 25:  7β-[[[(2-benzyloxy)carbonyl]thio]propionamido]-3-[[(5-methyl-3-isothiazolyl)thio]methyl]-8-oxo-5-thia-1-azabicyclo[4.2.0]oct-2-ene-2-carboxylic acid 26:  7β-[[[2-(methoxy)carbonyl]thio]-2-phenylacetyl]amino]-3-[[3-isoxazolyl)thio]methyl]-8-oxo-5-thia-1-azabicyclo[4.2.0]oct-2-ene-2-carboxylic acid 27:  7β-[[[2-(butoxy)carbonyl]thio]-2-phenylacetyl]amino]-3-[[(3-methyl-4-isoxazolyl)- thio]methyl]-8-oxo-5-thia-1-azabicyclo[4.2.0]oct-2-ene-2-carboxylic acid
28: 7β-[[[[2-(methoxy)carbonyl]thio]-2-phenylacetyl]-amino]-3-[[(3-methyl-1,2,4-oxadiazol-5-yl)thio]methyl]-8-oxo-5-thia-1-azabicyclo[4.2.0]oct-2-ene-2-carboxylic acid
29: 7β-[[[[2-(methoxy)carbonyl]thio]acetyl]amino]-3-[[1-ethyl-1H-tetrazol-5-yl)thio]methyl]-1-azabicyclo[4.2.0]oct-2-ene-2-carboxylic acid
30: 7β-[[[[2-(methoxy)carbonyl]thio]-2-phenylacetyl]amino]-3-[[(1-ethyl-1H-tetrazol-5-yl)thio]methyl]-8-oxo-5-thia-1-azabicyclo[4.2.-0]oct-2-ene-carboxylic acid
31: 7β-[[[[2-(ethoxy)carbonyl]thio]-2-phenylacetyl]amino]-3-[[3-thiazolyl]thio]methyl]-8-oxo-5-thia-1-azabicyclo[4.2.0]oct-2-ene-2-carboxylic acid
32: 7β-[[[[2-(methoxy)carbonyl]thio]-2-phenylacetyl]amino]-3-[[(2-methyl-1,3,4-thiadiazol-5-yl)thio]methyl]-8-oxo-5-thia-1-azabicyclo[4.2.0]oct-2-ene-2-carboxylic acid
33: 7β-[[[[2-(ethoxy)carbonyl]thio]-2-(2-furyl)acetyl]amino]-3-[[(5-methyl-1,3,4-thiadiazol-2-yl)thio]-methyl]-8-oxo-5-thia-1-azabicyclo[4.2.-0]oct-2-ene-2-carboxylic acid and potassium salt
34: 7β-[[[[2-(propoxy)carbonyl]thio]-2-(2-thienyl)acetyl]amino]-3-[[(1,3,4-oxadiazol-2-yl)thio]-methyl]-8-oxo-5-thia-1-azabicyclo[4.2.0]oct-2-ene-2-carboxylic acid and sodium salt
35: 7β-[[[[(2-ethoxy)carbonyl]thio]acetyl]amino]-3-[[(5-ethyl-1,3,4-oxadiazol-2-yl)thio]methyl]-8-oxo-5-thia-1-azabicyclo[4.2.0]oct-2-ene-2-carboxylic acid
36: 7β-[[[[2-(n-butoxy)carbonyl]thio]acetyl]amino]-3-[[(1,2,3,4-tetrazol-5-yl)thio]methyl]-8-oxo-5-thia-1-azabicyclo[4.2.0]oct-2-ene-2-carboxylic acid
37: 7β-[[[[2-(methoxy)carbonyl]thio]-2-(2-thienyl)acetyl]amino]-3-[[(2-methylthiazol-5-yl)thio]methyl]-8-oxo-5-thia-1-azabicyclo[4.2.0]oct-2-ene-2-carboxylic acid triethylamine salt
38: 7β-[[[[2-(benzyloxy)carbonyl]thio]-2-(3-furyl)acetyl]amino]-3-[[(1,2,4-thiadiazol-3-yl)thio]methyl]-8-oxo-5-thia-1-azabicyclo[4.2.0]oct-2-ene-2-carboxylic acid pivaloyloxymethyl ester
39: 7β-[[[[2-(methoxy)carbonyl]thio]-2-(3-pyridyl)acetyl]amino]-3-[[(3-isoxazolyl)thio]methyl]-8-oxo-5-thia-1-azabicyclo[4.2.0]oct-2-ene-2-carboxylic acid trimethylsilyl ester
40: 7β-[[[[2-(methoxy)carbonyl]thio]-2-(2-thienyl)acetyl]amino]-3-[[(1,3,4-oxodiazol-2-yl)thio]methyl]-8-oxo-5-thia-1-azabicyclo[4.2.0]oct-2-ene-2-carboxylic acid phenylmethyl ester
41: 7β-[[[[2-(ethoxy)carbonyl]thio]-2-phenylacetyl]amino]-3-[[(2-pyridinyl-N-oxide)-thio]methyl]-8-oxo-5-thia-1-azabicyclo[4.2.0]oct-2-ene-2-carboxylic acid
42: 7β-[[[[2-(benzyloxy)carbonyl]thio-2-phenyl]acetyl]amino]-3-[[(2-pyridinyl-N-oxide)thio]methyl]-8-oxo-5-thia-1-azabicyclo[4.2.0]oct-2-ene-2-carboxylic acid pivaloyloxymethyl ester
43: 7β-[[[[2-(methoxy)carbonyl]thio]acetyl]amino]-3-[[(2-pyridinyl-N-oxide)thio]methyl]-8-oxo-5-thia-1-azabicyclo[4.2.0]oct-2-ene-2-carboxylic acid and potassium salt.
44: 7β-[[[[2-(methoxy)carbonyl]thio]-2-phenylacetyl]amino]-3-[[(5-methyl-1,3,4-thiadiazol-2-yl)thio]methyl]-8-oxo-5-thia-1-azabicyclo[4.2.0]oct-2-ene-2-carboxylic acid and sodium salt.

What is claimed is:
1. A compound of the formula

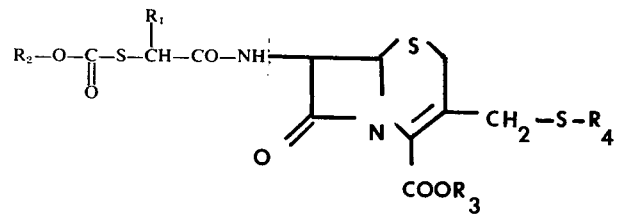

wherein $R_1$ is hydrogen, lower alkyl, phenyl, thienyl, furyl or pyridyl; $R_2$ is lower alkyl, phenyl-lower alkyl or diphenylmethyl; $R_3$ is hydrogen, lower alkyl, phenyl-lower alkyl, diphenylmethyl, tri(lower alkyl)silyl, tri(lower alkyl)stannyl, alkali metal, alkaline earth metal, mono (lower alkyl)amine salt, tri(lower alkyl)-amine salt or

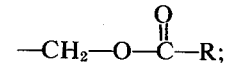

$R_4$ is $R_5$-isoxazole, $R_5$-isothiazole, $R_5$-oxadiazole, $R_5$-thiadiazole, $R_5$-tetrazole or $R_5$-1-oxopyridine; $R_5$ is hydrogen or lower alkyl; and R is lower alkyl, phenyl, phenyl-lower alkyl or diphenylmethyl; said lower alkyl groups having up to 8 carbon atoms.

2. A compound as in claim 1 wherein $R_1$ is phenyl.
3. A compound as in claim 1 wherein $R_1$ is hydrogen.
4. A compound as in claim 1 wherein $R_1$ is phenyl, $R_2$ is lower alkyl, $R_3$ is hydrogen and $R_4$ is (lower alkyl)tetrazole.
5. A compound as in claim 4 wherein each lower alkyl group is methyl.
6. Alkali metal salt of the compound of claim 5.
7. A salt as in claim 6 wherein the alkali metal is potassium.
8. A compound as in claim 1 wherein $R_1$ is phenyl, $R_2$ is lower alkyl, $R_3$ is hydrogen and $R_4$ is (lower alkyl)-thiadiazole.
9. A compound as in claim 8 wherein $R_2$ is methyl and $R_4$ is 5-methyl-1,3,4-thiadiazole.
10. A compound as in claim 1 wherein $R_1$ is hydrogen, lower alkyl of 1 to 4 carbons, phenyl, benzyl, furyl, thienyl or pyridyl; $R_2$ is lower alkyl of 1 to 4 carbons. $R_3$ is hydrogen, alkali metal, trimethylsilyl or

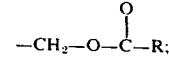

R is lower alkyl; $R_4$ is thiadiazole, tetrazole, (lower alkyl)thiadiazole or (lower alkyl)tetrazole.

* * * * *